United States Patent Office

3,358,014
Patented Dec. 12, 1967

3,358,014
PURIFICATION OF FURFURYL ALCOHOL-DERIVED LEVULINIC ESTERS
Andrew P. Dunlop, Riverside, and George W. Huffman, Crystal Lake, Ill., assignors to The Quaker Oats Company, Chicago, Ill., a corporation of New Jersey
No Drawing. Filed Feb. 3, 1964, Ser. No. 342,253
3 Claims. (Cl. 260—483)

ABSTRACT OF THE DISCLOSURE

This method produces low color, color-stable levulinic ester from color-unstable furfuryl alcohol-derived levulinic ester. The method involves heating the color-unstable ester with sulfuric acid and removing color-stable ester from the resulting mixture.

---

This invention relates to the production of color-stable furfuryl alcohol-derived levulinic esters.

Recent developments have made possible the production of levulinic acid from furfuryl alcohol. When furfuryl alcohol is contacted with another alcohol in the presence of certain halogen acids (for example in accordance with United States Patent No. 2,763,665 or copending application of Huffman and Stigger, now Patent No. 3,203,964), the furan ring opens as part of a sequence of reaction steps. The over-all result of the reaction is that a levulinic ester of the other alcohol is produced. The levulinate moiety is derived from the ring-opened furfuryl alcohol.

While levulinic esters themselves are substantially color stable in acidic conditions, the furfuryl alcohol-derived levulinic esters have been found to develop dark colors in the presence of light, and moreover color development is exaggerated by the presence of traces of acid. This is very undesirable since many of the uses for levulinic esters involve acidic conditions. Levulinic esters may be hydrolyzed in aqueous acid, for example, to produce levulinic acid. Acidic treatment of the ester would also be encountered, for example, in the production of bisphenol derivatives of these esters.

Color-stable esters can be prepared from color-unstable furfuryl alcohol-derived esters by very careful fractional distillation, for example by a distillation procedure involving a 100:1 reflux ratio for a substantial portion of the distillation. However, these are normally commercially unattractive procedures. Hence it would be very desirable to have a method for producing color-stable furfuryl alcohol-derived esters which does not require careful fractional distillation.

The term "color-stable levulinic ester" as used herein refers to esters of levulinic acid which exhibit a Gardner color of 3 or less after being tested according to the following procedure, which is hereinafter referred to as the "color-stability test": Concentrated hydrochloric acid (5 drops) is admixed with the sample (10 milliliters) and allowed to stand for 48 hours exposed to light at ambient room conditions. Gardner color of the sample is then determined. If the original sample has a color substantially darker than Gardner 1, it should be simply distilled prior to the color stability test. Simple distillation usually provides material having a Gardner color of 1 or less. The term "color-unstable levulinic esters" refers to those esters which develop greater color than Gardner 3, when subjected to this color-stability test.

Generally, esters to which this invention can be applied are any color-unstable esters which are produced by acid-catalyzed reaction between furfuryl alcohol and a different alcohol, for example, an unsubstituted primary or secondary carbon chain or oxygen-carbon chain aliphatic alcohol, or a carbon ring or oxygen-carbon ring cycloaliphatic alcohol, containing one to ten carbon atoms. Specific examples of the different alcohols include methanol, ethanol, n-propanol, isopropanol, n-butanol, isobutanol, n-pentanol, isopentanol, n-hexanol, n-octanol, n-nonyl alcohol, n-decanol, $\beta$-methoxy-ethanol, $\beta$-ethoxyethanol, cyclohexanol and tetrahydrofurfuryl alcohol.

In the production of levulinic acid from the color-unstable esters, the ester is usually acid-hydrolyzed, and water, catalyst, and alcohol are usually removed therefrom by distillation. The levulinic acid remaining has a dark, substantially tarry appearance and requires careful distillation to give a low-color product. It would be very desirable to produce low-color levulinic acid as a bottoms product in this procedure.

An object of this invention is to provide a method whereby low-color color-stable levulinic ester is produced from furfuryl alcohol-derived levulinic esters.

Another object is to provide a method for producing color-stable furfuryl alcohol-derived levulinic esters which does not require extremely careful distillation conditions.

A further object is to provide a method for producing color-stable furfuryl alcohol-derived levulinic esters which can produce a low-color color-stable levulinic acid as a bottoms product upon aqueous acid hydrolysis of that ester.

These and other objects which are apparent hereinafter are accomplished by the method comprising heating the color-unstable furfuryl alcohol-derived levulinic ester in the presence of sulfuric acid. Generally the sulfuric acid is subsequently neutralized and the levulinic ester is separated from the discolored materials, usually by distillation.

In the following examples all parts are in parts by weight, and all percents are in percent by weight, unless otherwise indicated.

*Example 1*

Butanol (2000 parts) was charged to a reactor fitted with a thermometer, a stirrer, a reflux condenser, and addition means. Concentrated (37% aqueous) hydrochloric acid (43.7 parts) was then charged to the stirred butanol. The reactor contents were then heated to reflux. Furfuryl alcohol (980 parts) was then added to the vigorously stirred contents of the reactor over a 90-minute period. After the addition of the furfuryl alcohol was complete, the reflux was continued for 1½ hours. The reactor contents were then distilled to obtain a butanol fraction and a butyl levulinate fraction. The butyl levulinate produced in accordance with this procedure had a Gardner color of one, but when tested according to the above color-stability test, the developed color was so dark that it was off the Gardner color scale, and the sample was opaque.

In commercial practice it is preferred, because of corrosion considerations, to neutralize the contents of the reactor in the procedure of Example 1 prior to the distillation of the butyl levulinate product. This procedure leads to a product having somewhat better light stability. When tested in accord with the above color-stability test, however, the product made by this alternate method develops color to substantially the same extent as the product of Example 1.

*Example 2*

Furfuryl alcohol-derived, color-unstable butyl levulinate, made in accordance with the procedure of Example 1 (150 parts), was charged to a glass-lined kettle, and sulfuric acid (1½ parts) was added slowly thereto with stirring. The solution was then heated and held at about 110° C. for about one hour and then cooled to about 55° C. A concentrated solution containing 1.24 parts of soduim hydroxide was added slowly to neutralize the sulfuric acid, and the reactor contents were washed with about 30 parts of water to remove the salts. Simple distillation of the organic phase under reduced pressure resulted in a 96% recovery of the ester charged. This distilled butyl levulinate had a Gardner color of one. Ten milliliters of the butyl levulinate product of Example 2 was subjected to the above color stability test, after which it had a Gardner color of 3.

Example 3

A portion of the butyl levulinate produced in Example 2 was hydrolyzed with aqueous hydrochloric acid with simultaneous removal of the butanol by azeotropic distillation. Upon completion of the hydrolysis, the hydrochloric acid and excess water were removed by distillation at atmospheric pressure to a pot temperature of 160° C. The bottoms, containing 96% levulinic acid, had a Gardner color of 5.

Example 4

The procedure of Example 1 was repeated up to the termination of the final 1½-hour reflux period. At this point the reactor contents were split into three equal separated portions. The first separated portion was distilled in a simple, substantially nonfractionating unit to give a butanol fraction, and a crude isolated butyl levulinate, having a Gardner color of one. This distilled ester gave a dark "off-scale" color when a portion of it was subjected to the above color-stability test. The ester fraction was heated in the presence of 1% sulfuric acid (based on the weight of the ester) for two hours at 120°±5°, after which it was cooled and neutralized. Butyl levulinate was then recovered by simple distillation. This distilled product, produced according to this invention, is called product 4A. The procedure by which product 4A is produced is hereinafter referred to as procedure 4A.

The second separated portion of the reactor contents was distilled to remove only the butanol. To the butyl levulinate-containing residue, 1% sulfuric acid (based on the weight of the ester) was added, and the acidified mixture was heated at 120° C.±5° for two hours. The material was then cooled and neutralized and butyl levulinate recovered therefrom by flash distillation. This product is identified as product 4B.

To the third separated portion of the reactor contents, 1% sulfuric acid by weight (based on the weight of the butyl levulinate) was added, and the mixture was heated at a temperature of about 113–114° C. (reflux) for a period of two hours, after which the contents were cooled, neutralized and flash-distilled to yield a butanol fraction and a butyl levulinate fraction. The butyl levulinate fraction was called product 4C.

The products 4A, 4B and 4C had a Gardner color of one, and were individually tested for color stability as above. Product 4A (produced according to this invention) had a Gardner color of one at the end of the test period, while products 4B and 4C developed a Gardner color of 14 and "off-scale," respectively.

Example 5

The procedure 4A, included as part of Example 4, was repeated twice, except that different acids were employed instead of sulfuric acid. These modified runs of Example 5 are referred to as runs 5A and 5B, respectively. In run 5A, 3% (based on the weight of the ester) of concentrated (37% aqueous) hydrochloric acid was used instead of the sulfuric acid, and the temperature was limited to 110° C., since at higher temperatures hydrochloric acid gas was evolved from the reflux condenser. In run 5B, 1.5% (based on the weight of the ester) concentrated phosphoric acid was used instead of the sulfuric acid. The products of runs 5A and 5B were then tested for color stability by the above test and gave a Gardner color of 13 and "off-scale," respectively. The product of the process of this invention (product 4A) gave a Gardner color of one after the same test.

In the utilization of this invention times, acid concentrations, and temperatures other than those used in the examples can be used, and these alternatives are well within the scope of this invention. The required concentration of the acid, temperature of contact, and time of contact are interrelated.

Example 2 illustrates one embodiment of this invention in which color-unstable furfuryl alcohol-derived butyl levulinate is contacted with 1% (based on the weight of the ester) sulfuric acid for about one hour at about 110° C. The butyl levulinate distilled from this reactor then had a color-stability test result of Gardner 3. The use of more acid in the purification process would decrease the contact time required for equivalent results at the same temperature. The use of a higher temperature would permit use of lower concentration of acid in order to achieve equivalent results. The use of longer times would permit lowering of acid concentration or temperature in order to achieve equivalent results, etc. However, sulfuric acid is used preferably in an amount greater than about 0.2% based on the weight of the ester. The temperature is preferably above about 75° C. The time of heating is preferably greater than about ½ hour.

A preferred embodiment comprises heating the color-unstable furfuryl alcohol-derived levulinate ester at a temperature at least about 110° C. in the presence of sulfuric acid in an amount at least about 1% by weight based on the weight of said ester for at least about one hour.

A more preferred embodiment comprises contacting a color-unstable furfuryl alcohol-derived levulinic ester at a temperature of at least about 120° C. for at least about two hours with sulfuric acid in an amount of at least about 1% by weight based on the weight of the color-unstable levulinic ester.

Example 3 illustrates the production of low-color levulinic acid as a bottoms product from a product of this invention. When the product of Example 1 is used, however, instead of a product of this invention, in the procedure of Example 3, the levulinic acid bottoms product has a dark color which is off the Gardner color scale.

Example 4 makes it clear that the furfuryl alcohol-derived ester must be separated from the reaction mixture in which it is formed before the ester is treated in accordance with this invention.

Example 5 illustrates that hydrochloric and phosphoric acids will not provide the benefit of this invention if used as substitutes for sulfuric acid, under otherwise similar conditions.

It is therefore clear that this invention provides a simple, unexpected and unobvious method for producing color-stable esters from color-unstable furfuryl alcohol-derived levulinic esters.

We claim:

1. A process for producing color-stable levulinic esters from color-unstable furfuryl alcohol-derived levulinic esters which are produced by acid catalyzed reaction between furfuryl alcohol and a different alcohol which contains 1 to 10 carbons and is selected from the group consisting of unsubstituted primary or secondary carbon chain or oxygen-carbon chain aliphatic alcohols, carbon ring or oxygen-carbon ring cyclo-aliphatic alcohols comprising heating said color-unstable ester at a temperature above 75° C. for a period of time greater than one-half hour, in the presence of sulfuric acid in an amount greater than 0.2 percent based on the weight of the ester, and thereafter distilling color-stable ester from the resulting mixture.

2. A process for producing color-stable levulinic ester from color-unstable furfuryl alcohol-derived levulinic ester produced by acid catalyzed reaction between furfuryl alcohol and a different alcohol which contains 1 to 10 carbon atoms and is selected from the group consisting of unsubstituted primary or secondary carbon chain or oxygen-carbon chain aliphatic alcohols, carbon ring or oxygen-carbon ring cyclo-aliphatic alcohols comprising heating said color-unstable ester at a temperature at least about 110° C. in the presence of sulfuric acid in an amount at least about 1% by weight based on the weight of said color-unstable furfuryl alcohol-derived levulinic ester, for at least about one hour.

3. A method of producing color-stable levulinic esters comprising contacting a color-unstable furfuryl alcohol-derived levulinic ester produced by acid catalyzed reaction between furfuryl alcohol and a different alcohol which contains 1 to 10 carbon atoms and is selected from the group consisting of unsubstituted primary or secondary carbon chain or oxygen-carbon chain aliphatic alcohols, carbon ring or oxygen-carbon ring cyclo-aliphatic alcohols at a temperature of at least about 120° C. for at least about two hours, with sulfuric acid in an amount of at least about 1% by weight based on the weight of the color-unstable levulinic ester.

References Cited

UNITED STATES PATENTS 2,763,665  9/1956  Lock et al. _____ 260—483

LORRAINE A. WEINBERGER, *Primary Examiner.*

V. GARNER, *Assistant Examiner.*